US006011858A

United States Patent [19]
Stock et al.

[11] Patent Number: 6,011,858
[45] Date of Patent: Jan. 4, 2000

[54] MEMORY CARD HAVING A BIOMETRIC TEMPLATE STORED THEREON AND SYSTEM FOR USING SAME

[75] Inventors: Michael J. Stock, Kansas City, Mo.; Keith Davis, Edgerton, Kans.; James W. Myers, Gladstone, Mo.

[73] Assignee: Biometric Tracking, L.L.C., North Kansas City, Mo.

[21] Appl. No.: 08/644,719

[22] Filed: May 10, 1996

[51] Int. Cl.⁷ .............................. G06K 9/00; H04L 9/00
[52] U.S. Cl. .............................. 382/115; 380/24
[58] Field of Search .................. 382/115, 116, 382/117, 118, 124, 128; 235/492, 493, 440, 441, 449, 486, 462, 375, 379, 384, 381, 382, 382.5; 380/24, 25, 21, 46

[56] References Cited

U.S. PATENT DOCUMENTS

| | | | |
|---|---|---|---|
| 5,302,811 | 4/1994 | Fukatsu | 235/381 |
| 5,566,327 | 10/1996 | Sehr | 395/600 |
| 5,577,121 | 11/1996 | Davis et al. | 380/24 |
| 5,679,945 | 10/1997 | Renner et al. | 235/492 |

OTHER PUBLICATIONS

GCI 200/GCR 200 Reference Manual (ROS V 7.3), Version 1.3, Reference RGD02U13, Jun. 1991, GEMPLUS Card International.

MPCOS Reference Manual, Version 1.0, Sep. 1994, by GEMPLUS.

MPCOS Technical Specifications, Version 1.0, May 1994, by GEMPLUS.

Using Development Platform, Reference Manual, Mar. 1994, by Innovatron Ingénierie.

*Primary Examiner*—Jose L. Couso
*Assistant Examiner*—Duy M. Dang
*Attorney, Agent, or Firm*—Fish & Richardson P.C.

[57] ABSTRACT

A programmable memory card is adapted to hold personal information of a user and includes a security feature for verify the true holder of the card. The memory card comprises application file structure for storing and maintaining personal information of a user for one or more applications. The memory card also includes security file structure for restricting access to the personal information in the application file structure. The security file structure comprises a biometric template of a physical characteristic of the user and is configured such that the user's real-time physical characteristic must be matched with the biometric template of the physical characteristic stored in the memory card to verify the true holder of the memory card and gain access to the contents of the application file structure.

35 Claims, 10 Drawing Sheets

MEMORY CARD HAVING A BIOMETRIC TEMPLATE STORED THEREON AND SYSTEM FOR USING SAME

FIELD OF THE INVENTION

The present invention relates to memory cards, and more particularly, to a memory card that includes a biometric template of a physical characteristic of the user for security purposes.

BACKGROUND OF THE INVENTION

Currently, commercial credit card transactions and similar electronic financial transactions are handled in a manner that provides only a minimum level of security wvith respect to protection of the owner of the credit card. In most retail operations, there are two methods of receiving approval of credit card sales: (1) the magnetic card reader method, and (2) the keypad entry method. Generally, approvals for credit card payments will be obtained on most transactions by sliding a credit card through a magnetic card reader. In some instances the magnetic stripe on the reverse side of the credit card cannot be read by the card reader, and it is necessary to enter the account number of the card holder through the keypad using the keypad method. For all authorized transactions, a sales slip must be imprinted with the customer's credit card and fully completed with detailed transaction information. Typically, a printer is connected to the terminal and the terminal is programmed for printing receipts such that the customer automatically receives a sales receipt.

With respect to security, the only possible way to authenticate the credit card owner is by the visual comparison of the signature on the sales draft to the signature on the back of the credit card. This comparison is restrictive and of limited value since it relies entirely on the training and competence of the sales clerk. The signature can easily be forged, thereby completely circumventing the system and allowing the possibility of fraud to occur which is common place.

Another security problem with current credit card processing relates to printed receipts that consumers obtain. Currently, printed receipts have consumers' signatures and credit card numbers on them. This receipt or carbons of the receipt can easily fall into the hands of someone who can use this information to make unauthorized purchases. As is evident, existing credit card processing has virtually no security for protecting credit card owners from unauthorized uses if credit cards are lost or stolen.

In recent years, the use of personal memory cards, also commonly known as "Smart Cards", has increased for financial transactions and other personal information uses. For example, personal memory cards have been used for managing financial transactions, and for storing personal information such as medical information, insurance information, etc. Memory cards are based on microprocessor technology and typically have a memory structure that includes both an EPROM type memory in which data can only be written and never erased or updated, and an EEPROM type memory in which data can be erased and updated. One type of memory card known as the Memory Chip Operating System (MCOS) card includes sufficient memory for a single application, such as a debit card account at a particular bank. MCOS cards typically have a memory size on the order of 2K to 3K bytes.

Another type of memory card available in the industry is known as the Multi-application Payment Card Operating System (MPCOS) card. MPCOS cards have the important advantage over MCOS cards of having an operating system that is dedicated to multiple electronic payment or other information applications. For example, an MPCOS card could contain information that would allow a user to use the card in connection with a bank payment system as well as credit card transactions for credit cards such as Master Card, Visa, American Express, etc. MPCOS cards are certainly not limited to two applications, but can include additional applications depending on the memory size available.

For security purposes, existing MCOS cards and MPCOS cards and other handheld cards typically use personal identification numbers (PIN) or passwords as the means to initiate or gain access to the card or the application being protected. Thus, a user must enter a unique PIN or password in order to access the stored information and commence a transaction. Although the use of PINs certainly provides an added measure of security over manual signature verification for credit card transactions as discussed above, the use of PINs or passwords to protect card owners is certainly not foolproof. For example, if a user keeps his or her PIN number written down in a purse or wallet in which the memory card is kept, a thief could gain easy access to the information stored in the memory card in this instance. Additionally, it is generally known among unscrupulous people that methods have been developed for lifting PIN numbers directly from memory cards.

Particularly as electronic financial transactions continue in growth, there is an ever-increasing need for strengthened security measures to adequately protect users of memory cards. With such increased security, users would then feel comfortable using memory cards for a wider range of applications, including multiple credit card accounts and bank accounts as swell as other personal financial or medical information. In this regard, memory cards could be used as all purpose financial and informational cards with the appropriate level of security, which has heretofore been unavailable for this type of application.

SUMMARY OF THE INVENTION

In view of the foregoing, it is the general aim of the present invention to provide a memory card having a greater level of security for protecting the contents of the memory card than currently available in existing systems.

In accomplishing that aim, it is a primary object of the present invention to provide a memory card that utilizes biometric verification of a user's physical characteristic to secure information on the card.

Another object of this invention is to provide a memory card with biometric verification capability that can accommodate multiple applications, such as financial transaction applications, medical information applications, security access applications, and other information applications.

A related object of the present invention is to provide a memory card which requires that biometric verification occur prior to access and processing of a sales or financial transaction.

Still another object of this invention is to provide a system for using a multi-purpose memory card that includes biometric template data of a user for verification and that requires no connection to an external network for the biometric verification process.

These and other aims and objectives are accomplished with the memory card of the present invention. The memory card is adapted to hold personal information of a user and includes a security feature for verifying the true holder of the card. The memory card includes application file structure for storing and maintaining the personal information of the user for one or more applications, such as financial transaction applications, medical information applications, computer network access applications, etc. The memory card also includes a security file structure for restricting access to the personal information in the application file structure. The security file structure comprises a biometric template of a physical characteristic of the user. The security file structure is configured such that the user's real-time physical characteristic must be matched wvith the biometric template of the physical characteristic stored in the memory card in order to verify the true holder of the card and provide access to the contents of the personal information stored in the application file structure.

The present invention also encompasses a biometric verification system for maintaining the security of information for one or more applications stored on a memory card. The biometric verification system includes a biometric scanner configured to generate a biometric template based on aphysical characteristic of the user. The biometric scanner is also configured to verify the user's live physical characteristic against a biometric template of the physical characteristic stored on the memory card. A programmable memory card reader is in communication with the biometric scanner and is configured to receive a memory card and to communicate with the biometric scanner to store the biometric template generated by the biometric scanner to the memory card. The memory card reader is also configured to retrieve the biometric template stored on the memory card and communicate the biometric template to the biometric scanner to verify the true holder of the memory card and to ensure the security of the information relating to the one or more applications stored on the memory card.

BRIEF DESCRIPTION OF THE DRAWINGS

The various aspects of the invention are described in detail below, with reference to the drawings, in which.

DETAILED DESCRIPTION OF THE PREFERRED EMBODIMENTS

Figure 1:
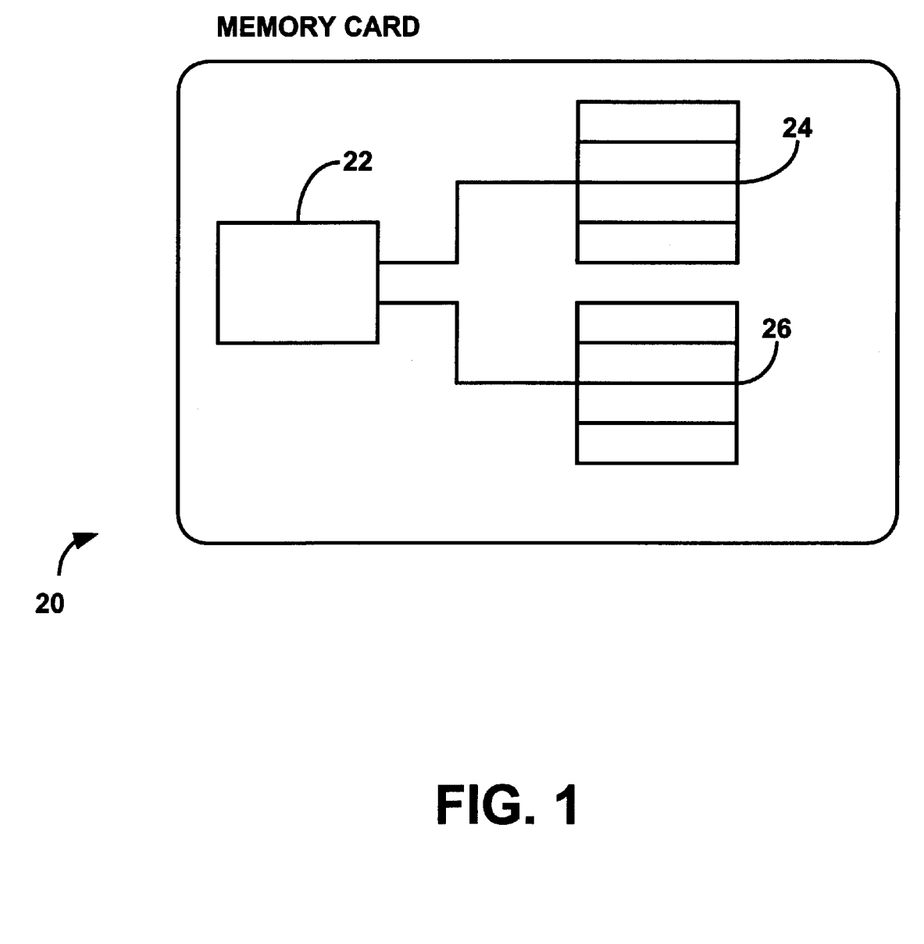
FIG. 1 is a simplified block diagram illustrating the components of the memory card according to the present invention.

A memory card for holding personal information of a user is broadly designated in FIG. 1 by the reference numeral 20. Memory card 20 is a microprocessor-based memory card commonly referred to as a "Smart Card." In the preferred embodiment of the present invention, memory card 20 comprises an MPCOS card such that information specific to the user for one or more applications can be stored and maintained on the card. In other words, memory card 20 can be configured to be a multi-purpose card for the user. For example, the multiple applications can include financial transaction applications, such as credit or charge card accounts or bank or debit accounts of the user, medical information applications, insurance information applications, security level applications to designate a particular security level of the user, and computer network access applications such as access to a company computer network or electronic mail system.

In accordance with the present invention, memory card 20 includes a security feature for verifying the true holder of the card. This security feature is based on biometric template data of a physical characteristic of a user. Generally, the term biometric data refers to a unique biological characteristic of an individual to verify that person's identity. Biometric identification systems digitally store personal characteristics that can be used to instantaneously and reliably identify individuals. Biometric identification uses a physiological trait, digitalized and stored, to accomplish the identification. The physical characteristic or traits of the user can include the pattern of a finger, the pattern of the palm of a person's hand, a signature, a voice pattern, finger length, retinal eye scan, etc.

Referring specifically to memory card 20 as shown in FIG. 1, memory card 20 includes processing circuitry 22 for processing the personal information of the user so that this information can be downloaded or written to memory card 20, accessed, and revised based on use of memory card 20 by the user. Processing circuitry 22 is connected to an application file structure 24 which stores and maintains the personal information of the user for one or more applications. For example, as noted above, the various applications could include one or more of a user's credit card or charge card accounts, a bank account or debit purse of the user, one or more electronic payment applications, health insurance and/or medical information of the user, etc. Memory card 20 also includes a security file structure 26 for the purpose of restricting access to the personal information stored and maintained in application file structure 24.

In accordance with the present invention, security file structure 26 includes a biometric template of a physical characteristic of the user. As explained in further detail below, the holder of a memory card would utilize a biometric scanner to generate a biometric template of the particular physical characteristic such as a live finger image. This biometric template is then downloaded into security file structure 26 of memory card 20. Security file structure 26 is configured such that the user's real-time physical characteristic must be matched with the biometric template of the physical characteristic stored in security file structure 26 in order to verify that the user is the true holder of memory card 20. Once biometric verification is complete, the user is provided access to the contents of application file structure 24 so that the user can conduct a personal transaction based on the information in the memory card.

In keeping with the present invention, because memory card 20 comprises a MPCOS card, the present invention allows users to store information relating to multiple applications with a level of security based on biometric verification far greater than existing systems such as systems that use PIN numbers. Thus, the present invention allows users of Smart Cards to store information on important financial and other applications that they heretofore would not be comfortable storing on a Smart Card for fear of theft of the information. In the preferred embodiment of the present invention, memory card 20 comprises an MPCOS card produced by GEMPLUS.

It should be noted that prior attempts have been made to store biometric data on MCOS type memory cards. However, a fundamental limitation with the MCOS card is that it can only store one file. Thus, information relating to even a single application could not be released from the MCOS card nor could the card initiate a software program if biometric data was on the card. Another important limitation with the use of MCOS cards and biometric data is that they require new firmware and internal hardware changes to be made before the biometric processor/scanner could read and verify the biometric data.

Figure 2:
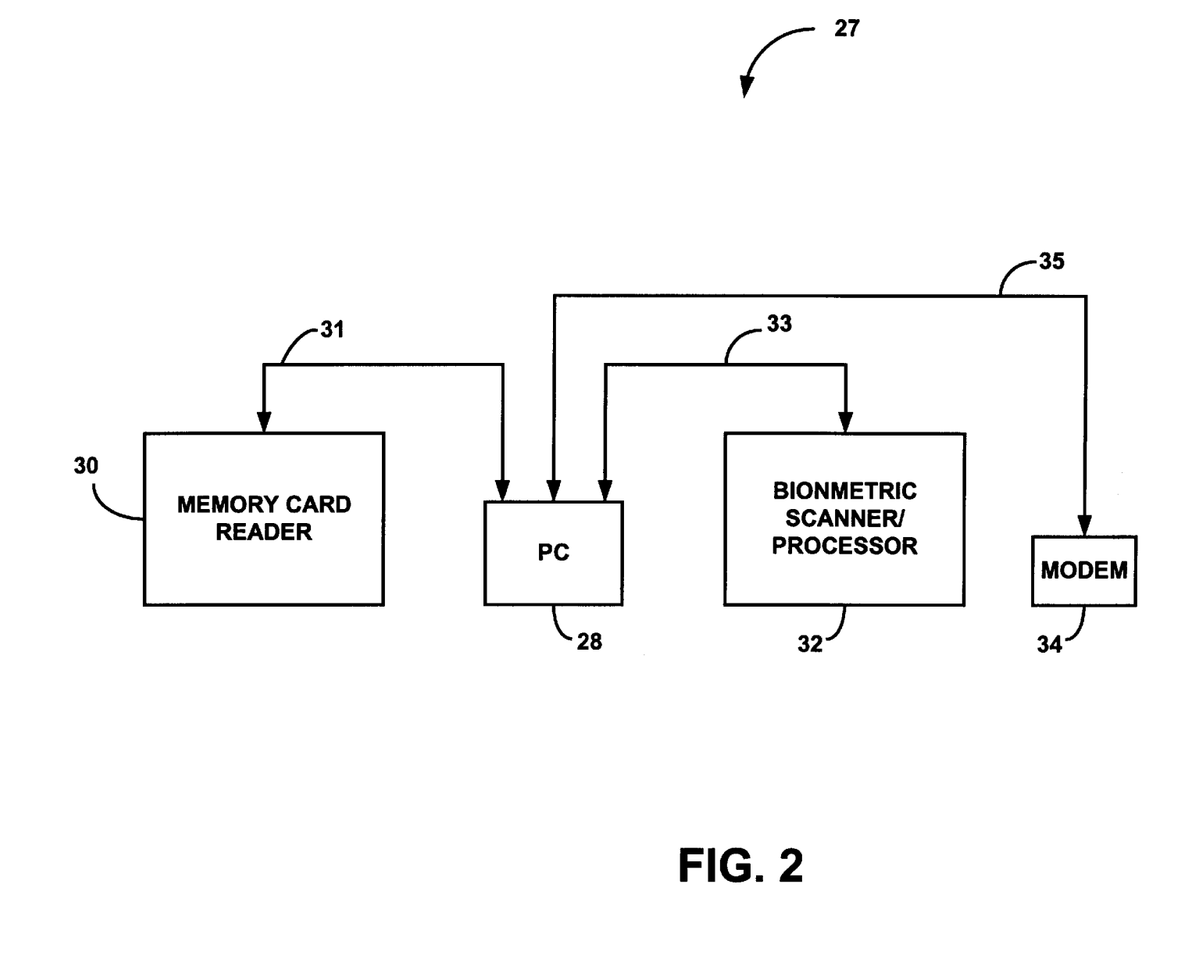
FIG. 2 is a block diagram illustrating the system for providing biometric verification of a memory card according to the present invention in the context of retail applications.

Referring now to FIG. 2, a system 27 for providing biometric verification of a memory card in accordance with the present invention is shown. FIG. 2 depicts an implementation of biometric verification system 27 in a retail application. More specifically, a personal computer 28 is configured to communicate with a memory card reader 30 and a biometric scanner/processor 32. As shown, personal computer 28 communicates with memory card reader 30 and biometric scanner/processor 32 via RS232 serial links 31 and 33. Additionally, personal computer 28 is connected to a credit card modem 34 via an RS232 serial link 35. Credit card modem 34 is in communication with a standard telephone line to provide access to the required credit card database information.

Memory card reader 30 includes a built-in LCD display, a keypad, and a modem in communication with personal computer 28. A suitable memory card reader for purposes of the present invention is the GCR500 produced by GEMPLUS. In practice, when a user wishes to use his memory card to purchase an item at a retail establishment, the user would insert his memory card into memory card reader 30. In the implementation of FIG. 2, personal computer 28 is programmed to direct memory card reader 32 to retrieve the user's biometric template from the memory card for purposes of biometric verification. The biometric template is communicated from memory card reader 30 to personal computer 28 and then on to biometric scanner/processor 32. The user would then place his finger or other physical characteristic on biometric scanner/processor 32 so that scanner 32 could conduct a real-time comparison of the stored biometric template and the user's live physical characteristic. If biometric scanner/processor 32 determines that there is a match between the biometric template and the physical characteristic of the user, the personal credit card account information of the user stored on the memory card will be released to personal computer 28. Then, in standard fashion, the retail operation would complete the transaction by processing the credit card information and verifiing the credit card number via credit card modem 34.

Biometric scanner/processor 32 is based on digital holography and involves an electro-optical scanner which reads three-dimensional data from a user's finger, for example, such as skin undulations, ridges and valleys, reflections and other living characteristics. Based on these various three-dimensional data, a unique personal pattern is generated. However, it should be noted that this pattern is not a fingerprint and does not rely upon two-dimensional print data. A suitable biometric scanner/processor for purposes of the present invention is the TOUCHLOCK II produced by Identix Incorporated of Sunnyvale, Calif.

The present invention allows the transactional data from the consumer transaction to be recorded directly to memory card 20. As noted previously, in current retail operations, the printed receipt contains the consumer's signature and credit card number. This receipt or carbon copies of the receipt can easily be stolen by a person who could then use the information to make unauthorized purchases. In keeping with the present invention, memory card 20 in conjunction with biometric verification system 27 can record the credit card transactions on the memory card so that these transactions can later be transferred onto a home computer of the user for storage and accounting records. Thus, printed paper receipts that display the credit card number and card holder's name are eliminated.

The present invention also eliminates the use of magnetic stripes on credit cards which currently contain the credit card information. In the present invention, the credit card information can be encrypted and stored on the memory card in a way that would require a biometric verification before the credit card information can be accessed. Thus, a user can include a number of different credit card accounts on the memory card which would eliminate the need to carry separate credit cards. This has the obvious advantage of eliminating credit card numbers that appear on the outside of the card which are often displayed in plain view.

Requiring biometric verification before a financial transaction occurs would greatly reduce credit card fraud which in turn would reduce overhead costs to places of business. The biometric verification process according to the present invention is repeatable and consistent The technology and programming employed in the present invention allows the false acceptance to be no greater than 0.0001% and the false rejection to be 1% or less.

Figure 3:
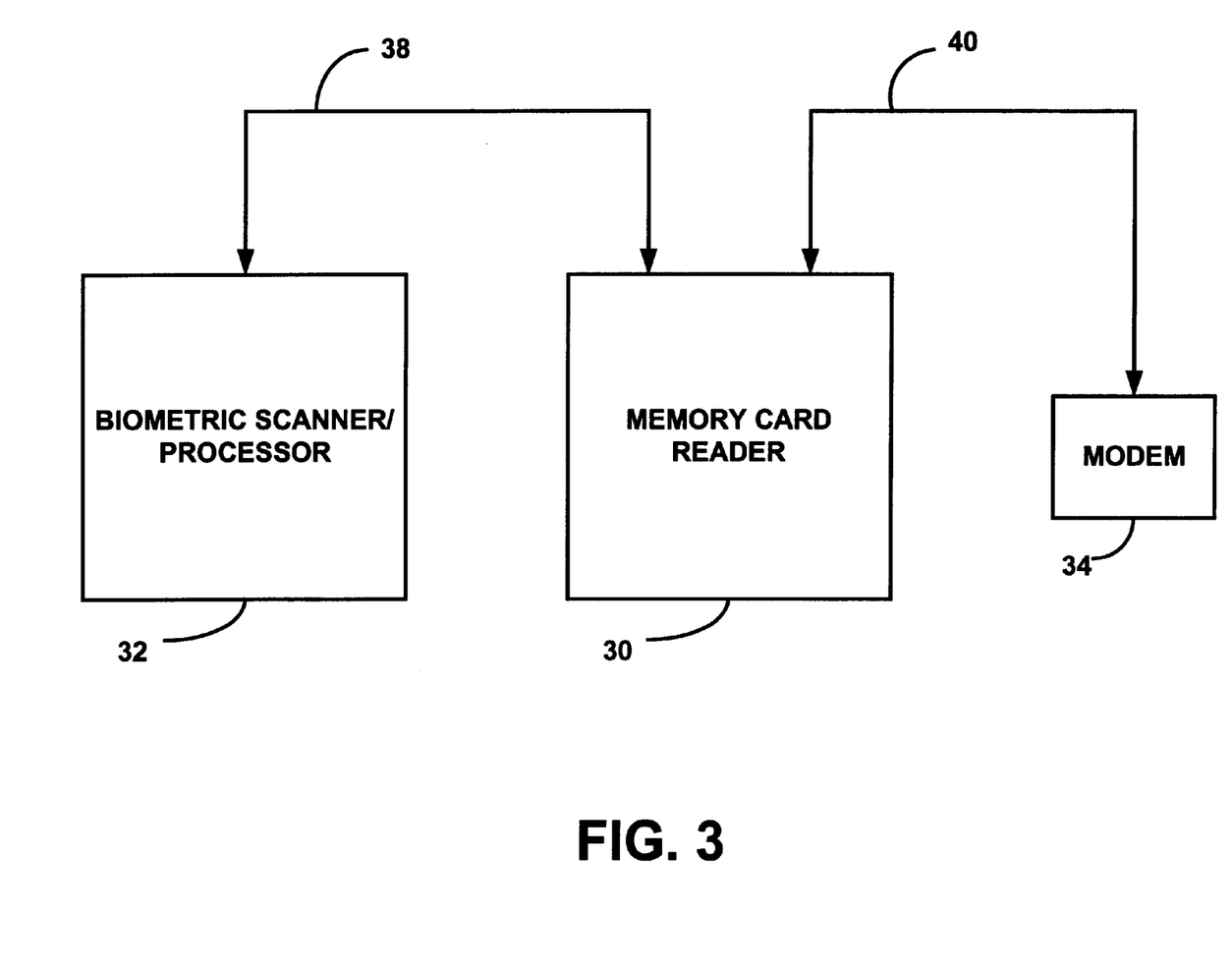
FIG. 3 is a simplified block diagram of a system for retail applications similar to the system shown in FIG. 2.

FIG. 3 depicts an alternative implementation of the biometric verification system of the present invention for a retail application similar to that of FIG. 2. Unlike the implementation of FIG. 2, biometric verification system 36 of FIG. 3 does not include a personal computer. Thus, in accordance with the present invention, and as described in detail below in connection with FIGS. 6–10, memory card reader 30 is programmed and configured to control the operation and biometric verification process. Similar to the operation described in connection with FIG. 2, a user would insert a memory card in memory card reader 30 to begin the retail transaction and the biometric verification. In system 36, memory card reader 30 is configured to extract the biometric template from the memory card and communicate the template directly to biometric processor/scanner 32 via RS232 serial link 38. The user places his finger or other physical characteristic on the biometric processor/scanner and the scanner 32 determines whether a match exists between the real-time image of the user and the biometric template from the memory card. When biometric verification is complete, memory card reader 30 releases the relevant retail credit card information stored in memory card 20 and communicates this information to credit card modem 34 via RS232 serial link 40.

A significant advantage of the implementation illustrated in FIG. 3 is that biometric verification system 36 can be configured as a stand-alone system without connection to a personal computer. Furthermore, in accordance with the present invention, the necessary programming and configuration steps required to both personalize and verify the biometric template on the memory card are executed in memory card reader 30. Thus, unlike existing uses of biometric scanners, biometric processor/scanner 32 of the present invention does not require either programmed memory of all possible biometric templates that would be verified, nor is there any requirement for biometric processor/scanner 32 to communicate with an external database in which biometric templates are stored. In other words, the biometric verification system of the present invention used in connection with memory card 20 requires no connection to a network. The biometric template is extracted from the multi-purpose memory card and processed in a local processing terminal/station to verify the card holder. This configuration allows rapid verification and does not depend on any outside system or network to be connected or running. Stated otherwise, the system works standing alone.

Figure 4:
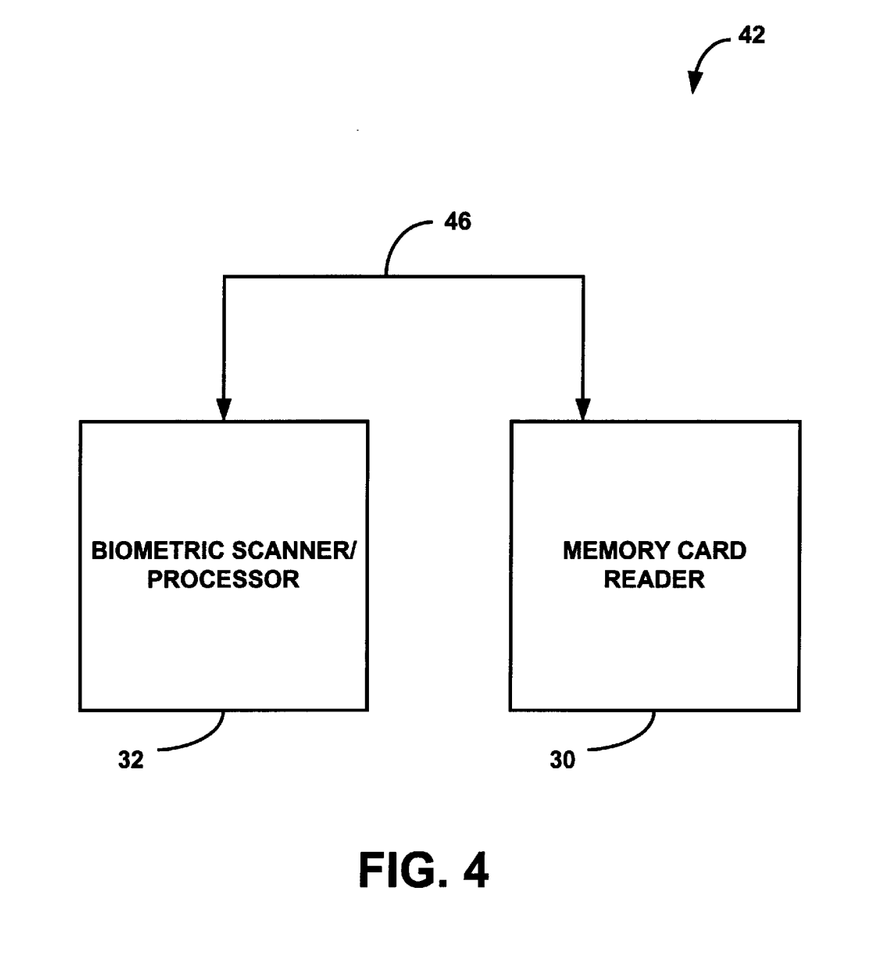
FIG. 4 is a simplified block diagram illustrating the components of a system for providing biometric verification of a memory card in applications other than credit or charge card applications.

FIG. 4 shows an alternative biometric verification system 42 according to the present invention. As can be seen, system 42 includes biometric processor/scanner 32 and memory card reader 30 in communication via communication line 46, but does not include a credit card modem for credit card verification purposes. Thus, biometric verification system 42 as shown in FIG. 4 is directed primarily to non-credit card applications, such as health care applications, security access control, debit purse applications and the like. Thus, for example, a stand-alone unit including biometric scanner/processor 32 and memory card reader 30 could be placed in a hospital or other medical facility so that a biometric verification could be conducted to access a patient's health insurance information and personal medical information. Alternatively, the biometric verification system 42 could be used to provide access to a secure office or other location in a similar manner, or to provide access to a computer network, etc.

Figure 5:
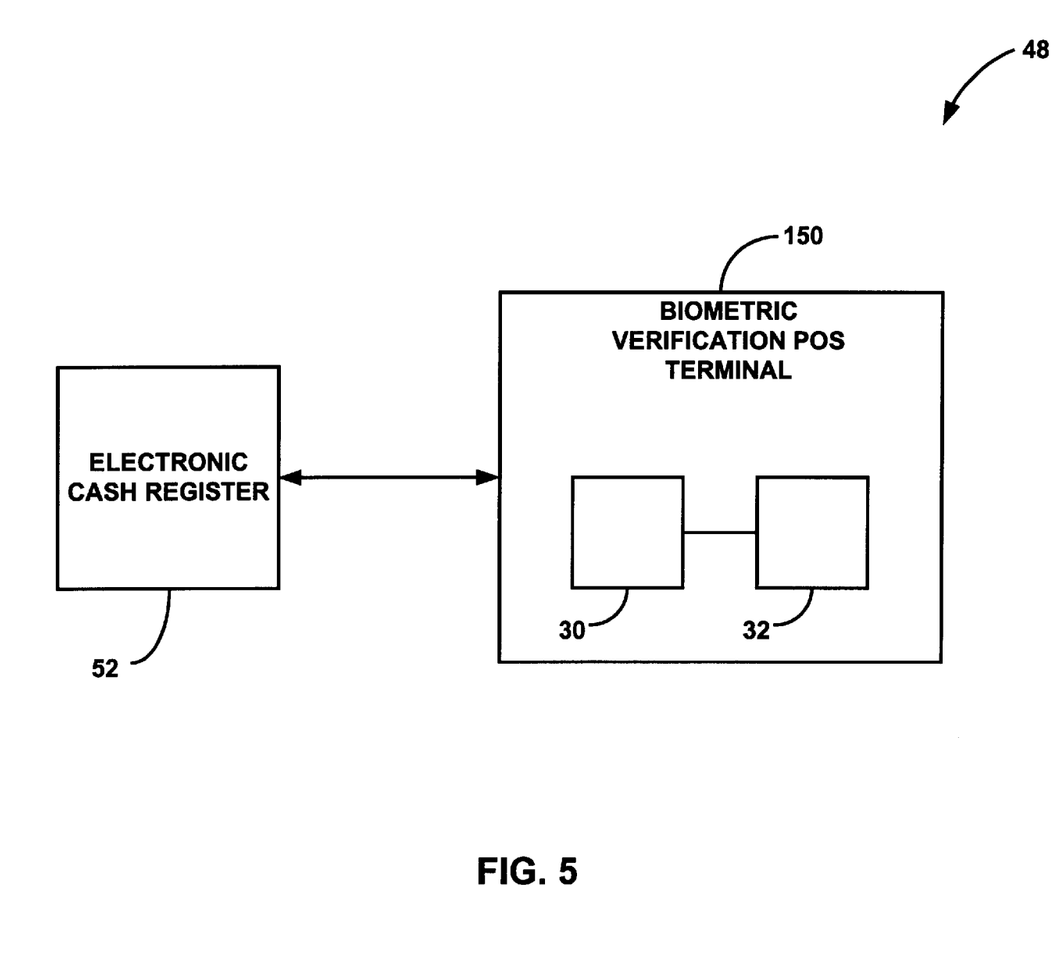
FIG. 5 is a simplified block diagram of the system for providing biometric verification of a memory card in the context of cash transaction applications.

Referring to FIG. 5, another implementation of the biometric verification system according to the present invention is shown and designated as system 48. In this embodiment of the present invention, biometric verification system 48 is implemented as a biometric verification point-of-sale (POS) terminal 50 in communication with an electronic cash register 52. Biometric verification system 48 as shown in FIG. 5 is directed primarily to debit purse applications in which a memory card is configured to hold a cash account. POS terminal 50 includes a built-in memory card reader 30 and biometric scanner/processor 32 to conduct biometric verification. In this implementation, a user would insert a memory card in the POS terminal and the memory card reader would extract the user's biometric template in the manner described previously. The user would also place the required physical characteristic, e.g., a finger, on the biometric scanner of POS terminal 50 to perform a biometric verification. If verification determines that the user is the true holder of the memory card, the cash account on the memory card is debited for the purchase amount and this cash amount is communicated to electronic cash register 52 to reflect payment for the purchase.

An exemplary environment for biometric verification system 48 in the form of a point-of-sale terminal 50 is a college book store. Students of the college would carry personal memory cards with cash accounts stored on the accounts and could use the memory cards at the college book store to make purchases. As is evident, the implementation shown in FIG. 5 could be used in a wide variety of environments or locations that would benefit from cash transactions that do not require hard currency.

Details will now be provided relating to the software programming steps required to personalie memory card 20 of the present invention by writing a biometric template of a physical characteristic of a user to memory card 20. Details will also be provided on conducting a biometric verification of the template stored on the memory card. Initially, it should be appreciated that the software program for implementing the present invention provides significant flexibility in configuring the hardware components of the biometric verification system of the present invention. Specifically, no additional internal hardware changes or firmware or programming changes are required of the biometric scanner/processor in order for the biometric scanner to read and verify the biometric template data from the memory card of the present invention.

Figure 6:
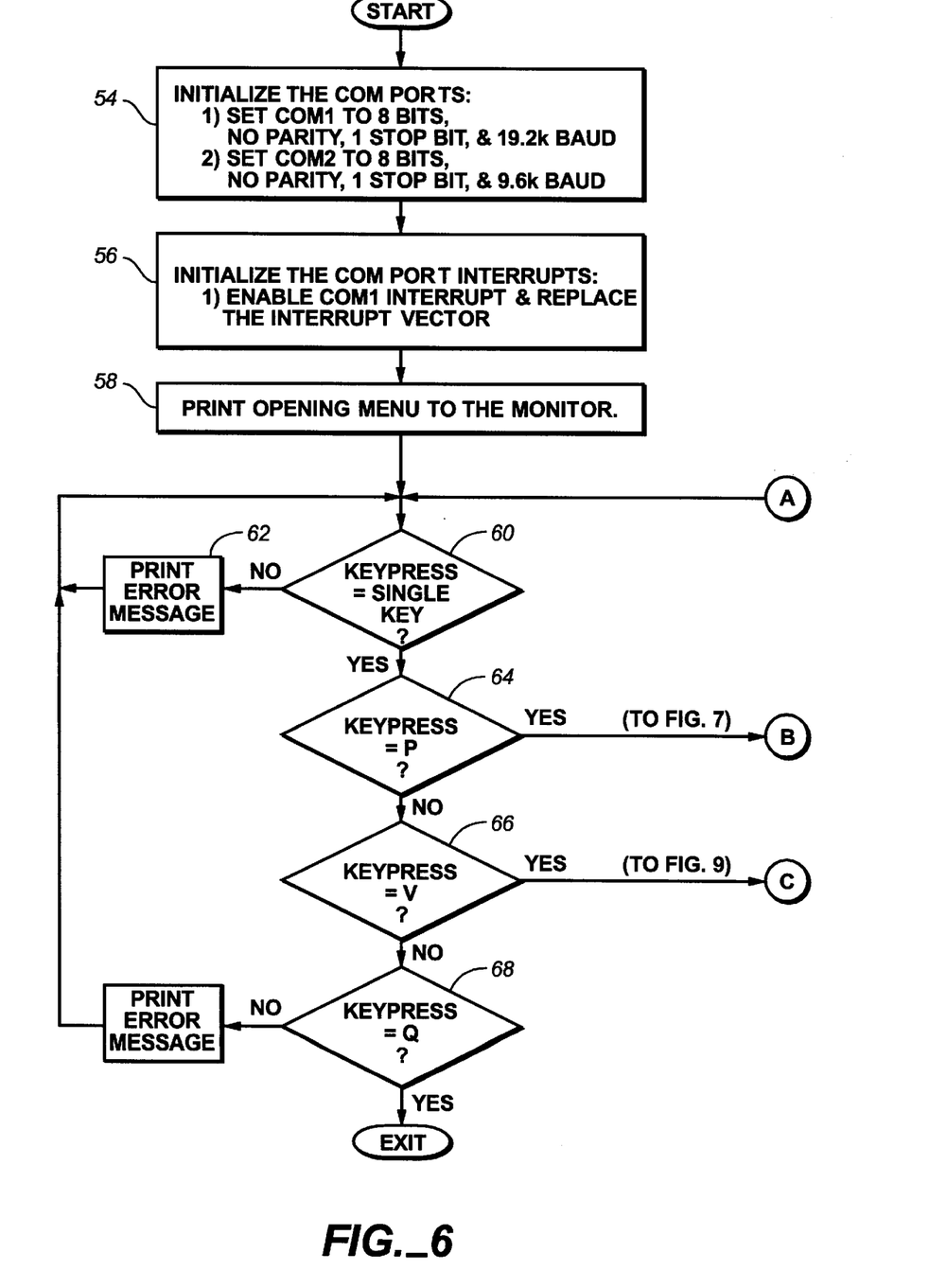
FIGS. 6–8 illustrate the process for storing biometric template data on the memory card of the present invention.

Referring first to FIG. 6, in step 54 the communication ports are initialized. Com 1 is used to communicate with memory card reader 30 and Com 2 is used to communicate with biometric scanner/processor 32. In step 56, the Com port interrupts are initialized by enabling the Com 1 interrupt and replacing the interrupt vector. As a byte of information is received by each UART (Universal Asynchronous Receiver-Transmitter) it must be read from the UART and stored in a buffer in a timely manner so that the byte is not overwritten by the next byte of information being transmitted. The interrupt service routine accomplishes this task and also verifies that the first and last bytes of information received match expectation. The interrupt also counts the number of bytes received in each port.

Figure 7:
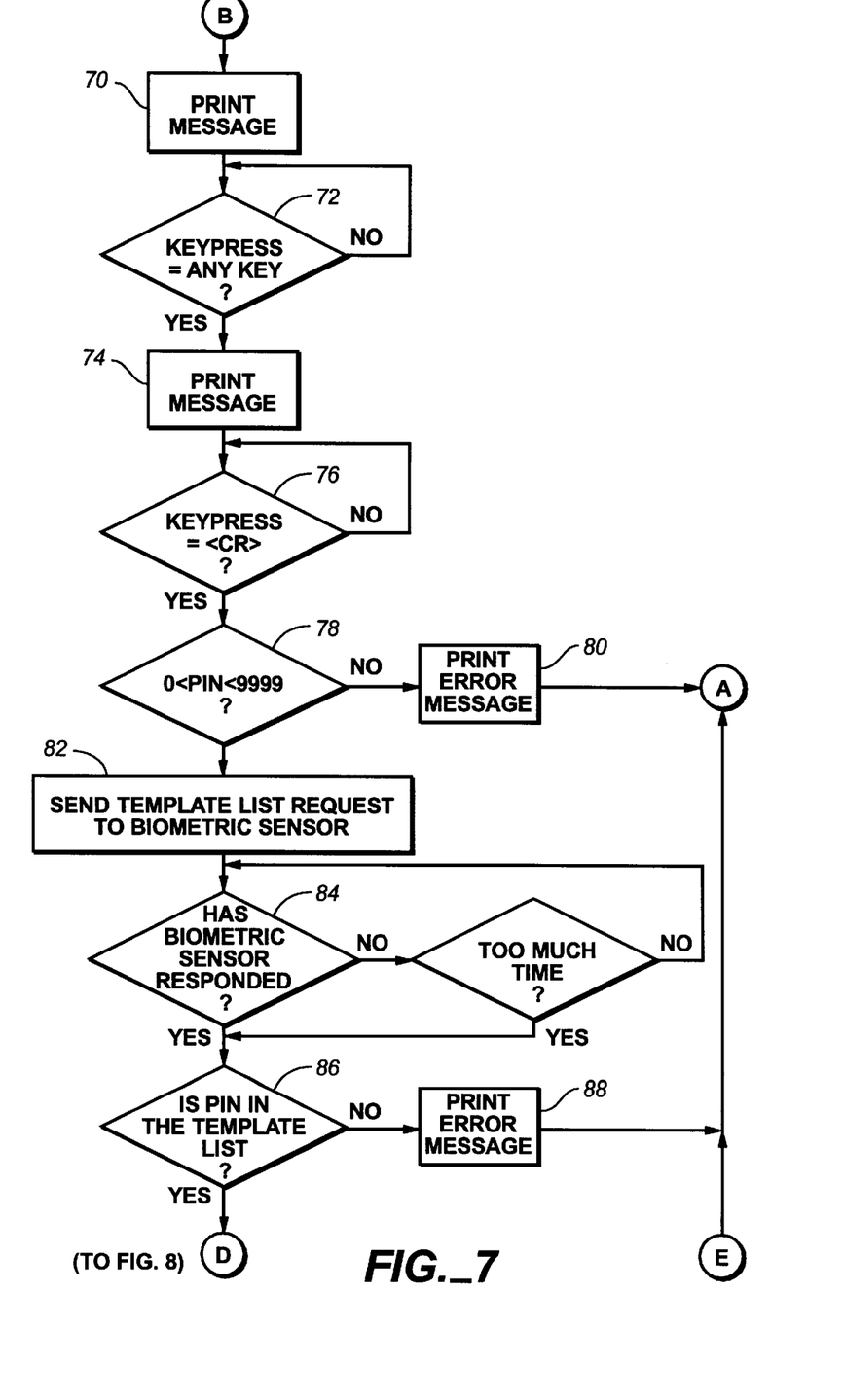
Figure 8:
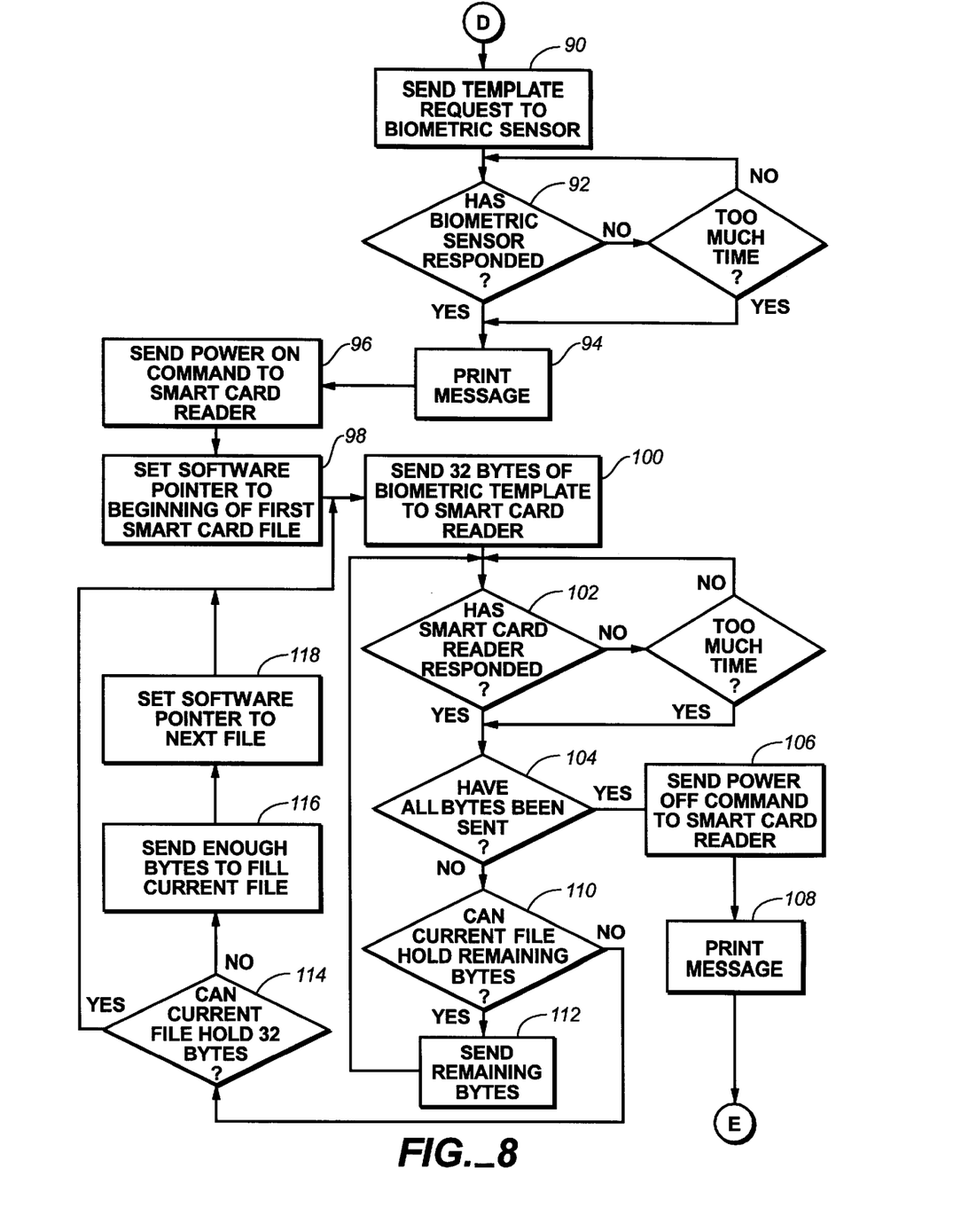
Figure 9:
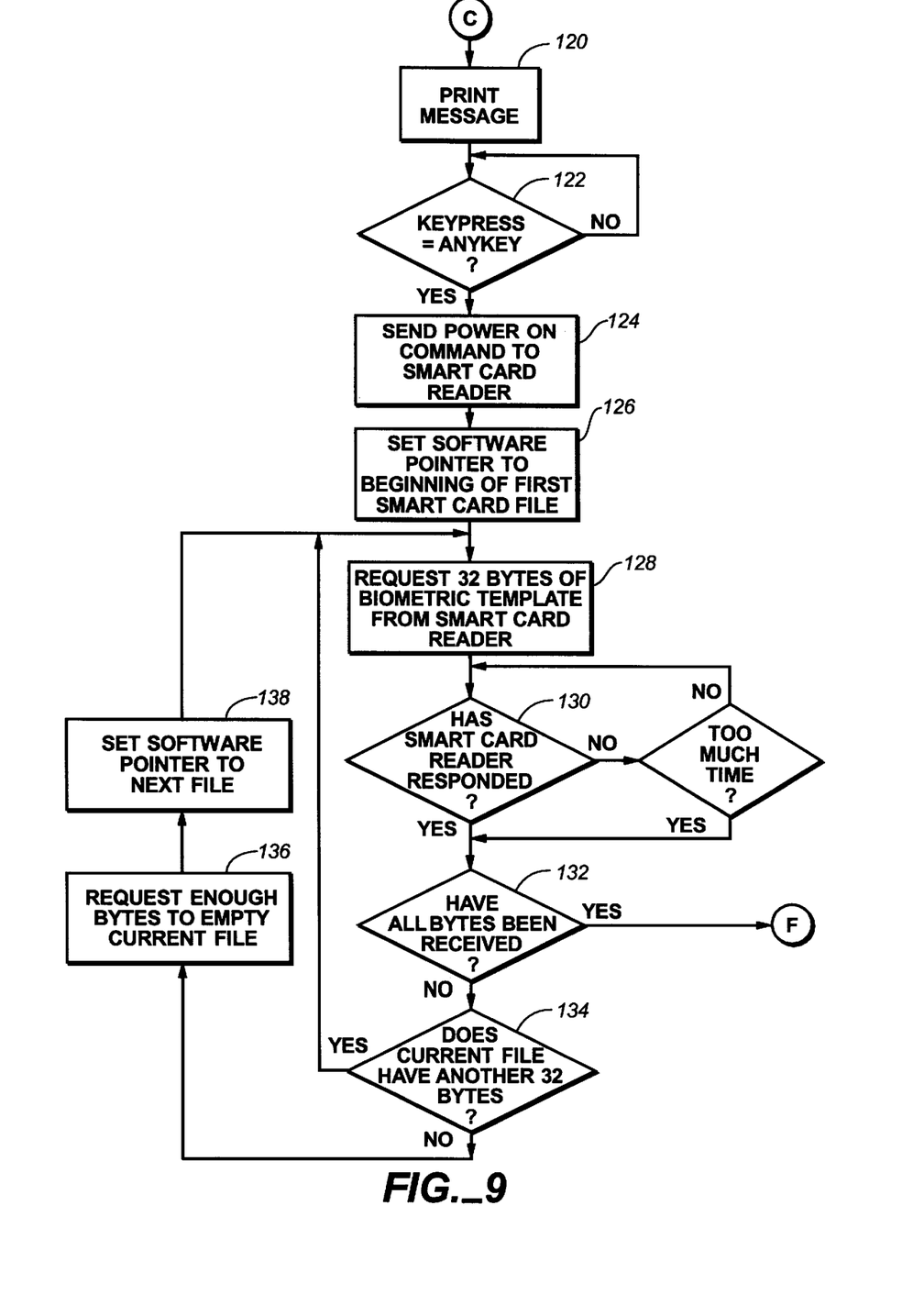
FIGS. 9–10 illustrate the process for providing biometric verification of the memory card of the present invention.
Figure 10:
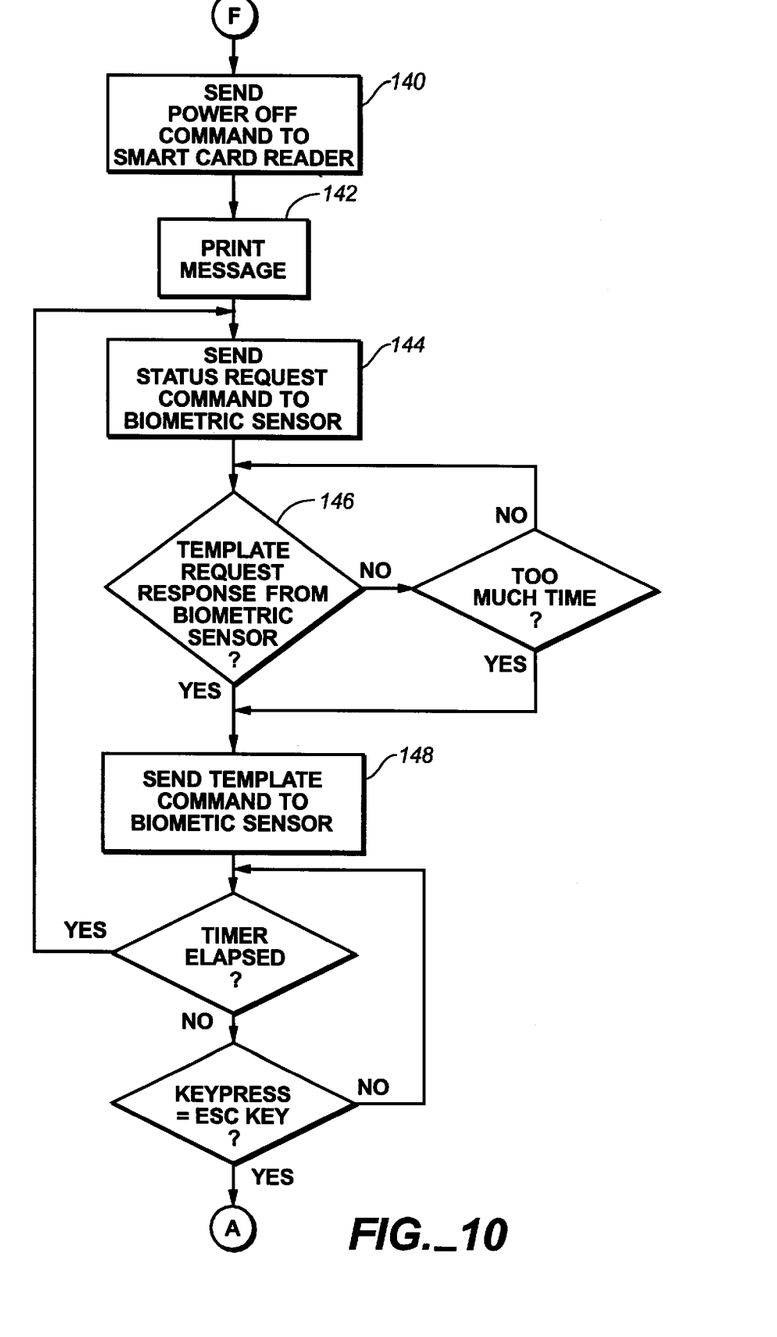

Following step 56, the opening menu is presented to the monitor as shown in step 58 to provide three choices for the user. To personalize a memory card with a biometric template, the user must press "P" and then the carriage return. To verify the biometric template that has been previously stored on a memory card, the user must press "V" and then the carriage return. To quit the program, the user must press "Q" and then the carriage return. In step 60, the programming determines whether a single key on the keyboard has been pressed. If more than one key has been pressed, an error message is printed as shown in block 62 and the user must begin again. Lower case entries are automatically converted to upper case. Also, if a single key other than "P", "V", or "Q" is pressed, an error message will be written. As shown in FIG. 6, if the user presses the "P" key as determined at step 64, the personalization process will begin as illustrated at FIGS. 7 and 8. If the user presses the "V" key as determined by step 66, the verification process will be implemented as illustrated at FIGS. 9 and 10. If the "Q" key is pressed as determined by step 68, then the user will exit the program.

Turning to FIG. 7 which details the process of personalizing a memory card by loading a biometric template on the card, a message is first printed to the screen at step 70 prompting a user to enroll his biometric template on the biometric scanner/processor and insert a memory card into the memory card reader before proceeding. The user indicates that these tasks have been accomplished by pressing any key on the keyboard as determined at step 72. In step 74, the user is prompted to enter his PIN on the keyboard and then press the carriage return as determined by step 76. Step 78 determines whether the PIN entered by the user is within allowable numerical limits. If the PIN does not fall within the allowable limits, an error message is written to the monitor and the user must begin the process again as reflected in block 80. If the PIN is acceptable, the biometric scanner/processor is sent a command requesting a list of all biometric templates that it has in memory at step 82. At step 84, a determination is made as to whether the biometric scanner has responded. If not, an error message will be written and the user must begin again. If the biometric sensor responds, the PIN entered from the keyboard is checked against the list received from the biometric scanner as reflected in step 86. If no match is found, a message is written to the monitor and the user must begin the process again as reflected in block 88. If the PIN is in the template list, the process proceeds to the steps illustrated in FIG. 8.

Because the user has previously enrolled his biometric template into the biometric scanner, the biometric scanner is sent a command requesting it to send the user's biometric template at step 90. Once the biometric scanner responds by sending the template to the memory card reader as determined by step 92, a status message reflecting this is sent to the monitor as shown in step 94. Following this, the memory card reader applies power to the memory card at step 96.

In the particular implementation described herein, the file size on the memory card has been selected to be 255 bytes and the memory card file must be written in increments of 32 bytes or smaller. Therefore, the programming must keep track of which file is currently being written, how many bytes of data have been written to it, and how many bytes of the biometric template remain to be written to the memory card in order to separate the single file from the biometric scanner into multiple files in the security file structure on the memory card. This separation of the single file into multiple files on the memory card has the important advantage of adding additional security to the memory card. For example, the memory card could be configured so that the biometric template is scrambled into nonsequential files on the memory card to significantly increase the difficulty of breaking into the memory card and extracting the personal information contained therein. In the illustrated embodiment, the biometric template is approximately 1.2K bytes thus requiring five memory files of the memory card.

Referring still to FIG. 8, at step 98 the software pointer is set to the beginning of the first memory card file. Then, as shown in step 100, 32 bytes of the biometric template data are sent to the memory card reader and thus to the first memory card file. If the memory card reader responds as determined at step 102, the program determines whether all biometric template data bytes have been written at step 104. If yes, a command is sent to the memory card reader to remove power from the memory card as shown in step 106 and a message is sent to the screen reflecting this as shown in step 108. If there are additional biometric template bytes, the number of data bytes remaining to be written is compared to the available space in the selected memory card file at step 110. If the selected file has room for the remaining data bytes, they are written to the file as reflected at step 112. If the selected file cannot hold all the remaining data bytes that need to be written, a determination is made as to whether the selected file can hold another 32 data bytes at step 114. If yes, the program returns to step 100 and another 32 bytes of biometric template data are written to the selected file. If another 32 data bytes cannot be held in the current file, the number of bytes required to fill the currently selected memory card file are sent to the memory card reader as shown in step 116, and then the next memory card file is selected at step 118.

FIGS. 9 and 10 illustrate the biometric verification process conducted on a memory card according to the present invention. In FIG. 9, the user is prompted at step 120 to insert a memory card into the memory card reader before proceeding. The user indicates that this has been accomplished by pressing any key on the keyboard as determined at step 122. The memory card reader is then sent a command to apply power to the memory card at step 124. As noted previously, in the illustrated implementation, the file size on the memory card has been selected to be 255 bytes and the memory card file must be read in increments of 32 bytes or smaller. However, it should be appreciated that file sizes can vary depending upon the particular application or on the requirements or preference of the user and/or memory card manufacturer.

Similar to the personalization process described above, the programming must keep track of which file is currently being read, how many bytes of data have been read from the file, and how many bytes of the biometric template remain to be read from the memory card in order to reassemble the biometric template into one file required by the biometric scanner. At step 126, the software pointer is set to the beginning of the first memory card file. Then, at step 128 the program requests 32 bytes of biometric template data from the first memory card file. If the memory card responds as determined at step 130, the process determines whether all bytes have been received at step 132. If all biometric template data bytes have been read from the memory card files, a command is sent to the memory card reader to remove power from the memory card. If additional biometric template data bytes remain, the number of data bytes remaining to be read to complete the biometric template is compared to the available space in the selected memory card file. If the number of remaining data bytes is 32 or greater and the selected file has at least 32 remaining data bytes as determined at step 134, then the process returns to step 128 and 32 data bytes are read from the file. If the number of remaining data bytes is less than 32 and the selected file has that many remaining data bytes, they are read from the file at step 136. If neither of these conditions is met, the number of bytes required to empty the currently selected memory card file are read from the file and the next memory card file is selected as reflected in step 138.

Referring now to FIG. 10, when the complete biometric template has been read from the memory card, the memory card reader removes power from the memory card at step 140, and a status message reflecting this is written to the monitor at step 142. Beginning at step 144, the software program begins a periodic polling of the biometric scanner requesting its status. When the biometric scanner responds with a message requesting a biometric template as determined at step 146, the template that was read from the memory card is sent to the biometric scanner at step 148 in order to allow the biometric scanner to conduct a biometric verification.

As is evident from the foregoing description, the memory card and the biometric verification system according to the present invention provide an unparalleled level of security to an owner of the card by placing a biometric template of a physical characteristic of the owner on the memory card. The only way that the personal information of the user stored on the memory card can be accessed is if the user's real-time biometric characteristic matches the biometric template data stored on the memory card. The present invention can be used in a wide variety of applications, and is particularly useful for protecting financial transaction information such as credit card information. Importantly, the memory card of the present invention allows a user to secure through biometric verification a multiple number of applications so that the memory card can become in effect an all-purpose informational and transactional card for a user.

While this invention has been described with an emphasis upon preferred embodiments, it will be understood by those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

We claim:

1. A programmable memory card adapted to hold personal information of a user including a security feature for verifying the true holder of the card, the memory card comprising:

application file structure for storing and maintaining personal information of a user for multiple applications; and security file structure for restricting access to the personal information in the application file structure, the security file structure comprising a biometric template of a physical characteristic of the user, the security file structure configured such that the user's real-time physical characteristic must be matched with the biometric template of the physical characteristic stored in the memory card to verify the true holder of the memory card and gain access to the contents of the application file structure.

2. The memory card as defined in claim 1 further comprising:

processing circuitry for processing the personal information in the application file structure so that said information can be accepted, accessed, and revised based on use of the memory card by the user, wherein the processing circuitry also processes the biometric template data in the security file structure.

3. The memory card as defined in claim 1 wherein the one or more applications comprise financial transaction applications, medical information applications, insurance applications, security level applications, and computer network access applications.

4. The memory card as defined in claim 3 wherein the personal information comprises one or more credit or charge card accounts of the user.

5. The memory card as defined in claim 3 wherein the personal information comprises a bank or debit account of the user.

6. The memory card as defined in claim 3 wherein the personal information comprises health insurance and/or medical history information of the user.

7. The memory card as defined in claim 1 wherein the memory card comprises a Multi-application Payment Card Operating System (MPCOS) card.

8. The memory card as defined in claim 7 wherein the personal information of the MPCOS card includes one or more electronic payment applications.

9. The memory card as defined in claim 1 wherein the memory card operates in conjunction with a programmable memory card reader in communication with a biometric scanner, and wherein the programmable memory card reader is configured to access and retrieve the biometric template stored on the user's memory card and communicate the biometric template to the biometric scanner so that said scanner can compare said template with a real-time biometric scan of the particular physical characteristic of the user to verify the true holder of the memory card and allow access to the personal information stored on the memory card.

10. The memory card as defined in claim 1 wherein the physical characteristic comprises an image of a finger of the user.

11. The memory card as defined in claim 1 wherein the physical characteristic comprises an image of a palm of the user.

12. The memory card as defined in claim 1 wherein the physical characteristic comprises an image of a retina of the user.

13. The memory card as defined in claim 1 wherein the biometric template is separated and stored in a plurality of memory files within the security file structure.

14. A memory card containing information specific to a user, the memory card having a security feature for verifying the true holder of the card, the memory card comprising:

application memory structure for storing and maintaining user-specific information relating to multiple applications;

processing circuitry for processing the user-specific information contained in the application memory structure so that said information can be sorted, retrieved, and revised as required based on use of the memory card by the user; and security memory structure for securing the user-specific information in the application memory structure, the security memory structure including a biometric template of a physical characteristic of the user, the security memory structure configured such that the user's physical characteristic must be matched with the biometric template of the physical characteristic stored in the memory card to verify the true holder of the memory card when access to the user-specific information is desired.

15. The memory card as defined in claim 14 wherein the processing circuitry also processes the biometric template data in the security memory structure.

16. The memory card as defined in claim 14 wherein the one or more applications comprise financial transaction applications, medical information applications, insurance applications, security level applications, and computer network access applications.

17. The memory card as defined in claim 16 wherein the user-specific information comprises one or more credit or charge card accounts of the user.

18. The memory card as defined in claim 16 wherein the user-specific information comprises a bank or debit account of the user.

19. The memory card as defined in claim 14 wherein the memory card operates in conjunction with a programmable memory card reader in communication with a biometric scanner, and wherein the programmable memory card reader is configured to access and retrieve the biometric template stored on the user's memory card and communicate the biometric template to the biometric scanner so that said scanner can compare said template with a real-time biometric scan of the particular physical characteristic of the user to verify the true holder of the memory card and allow access to the user-specific information stored on the memory card.

20. The memory card as defined in claim 14 wherein the physical characteristic comprises an image of a finger of the user.

21. The memory card as defined in claim 14 wherein the physical characteristic comprises an image of a palm of the user.

22. The memory card as defined in claim 14 wherein the physical characteristic comprises an image of a retina of the user.

23. The memory card as defined in claim 14 wherein the biometric template is separated and stored in a plurality of memory files within the security memory structure.

24. A biometric verification system for maintaining the security of information relating to multiple applications stored on a personal memory card of a user, the memory card including a biometric template of a physical characteristic of the user, the system comprising:

a biometric scanner configured to generate a biometric template based on a physical characteristic of a user, the biometric scanner also configured to verify the user's live physical characteristic and the biometric template of the physical characteristic stored on the memory card; and a programmable memory card reader in communication with the biometric scanner, the memory card reader configured to receive a memory card and to communicate with the biometric scanner to store the biometric template generated by the biometric scanner to the memory card, the memory card reader also configured to retrieve the biometric template stored on the memory card and communicate the biometric template to the biometric scanner to verify the true holder of the memory card and to ensure the security of the information relating to the one or more applications stored on the memory card.

25. The biometric verification system as defined in claim 24 wherein the programmable memory card reader communicates directly with the biometric scanner, and wherein the programmable memory card reader is configured with program instructions for controlling the operation of communicating with the biometric scanner to store the biometric template to the memory card and to retrieve the biometric template stored on the memory card and communicate the biometric template to the biometric scanner to verify the true holder of the memory card.

26. The biometric verification system as defined in claim 24 wherein the programmable memory card reader communicates with the biometric scanner via a personal computer, and wherein the personal computer includes program instructions for controlling the operation of communicating with the biometric scanner and the memory card reader to store the biometric template to the memory card and to retrieve the biometric template stored on the memory card and communicate the biometric template to the biometric scanner to verify the true holder of the memory card.

27. The biometric verification system as defined in claim 24 wherein the memory card reader will allow access to the information stored on the memory card if the biometric scanner verification determines that the user's live physical characteristic matches the biometric template stored on the memory card.

28. The biometric verification system as defined in claim 24 wherein the one or more applications comprise financial transaction applications, medical information applications, insurance applications, security level applications, and computer network access applications.

29. The biometric verification system as defined in claim 28 wherein the system further comprises communications means connected to the programmable memory card reader for communicating the information stored on the memory card to an external location.

30. The biometric verification system as defined in claim 24 wherein the system comprises a stand-alone system.

31. The biometric verification system as defined in claim 30 wherein the system comprises a point-of-sale (POS) terminal.

32. The biometric verification system as defined in claim 24 wherein the biometric template is separated and stored in a plurality of memory files on the memory card.

33. The biometric verification system as defined in claim 24 wherein the physical characteristic comprises an image of a finger of the user.

34. The biometric verification system as defined in claim 24 wherein the memory card comprises a Multi-application Payment Card Operating System (MPCOS) card including one or more electronic payment applications.

35. A programmable memory card adapted to hold personal information of a user including a security feature for verifying the true holder of the card, the memory card comprising:

application file structure for storing and maintaining personal information of a user for multiple applications; and security file structure for restricting access to the personal information in the application file structure, the security file structure comprising a biometric template of a unique three dimensional physical characteristic of the user, the security file structure configured such that the user's real-time unique three dimensional physical characteristic must be matched with the biometric template of the unique three dimensional physical characteristic stored in the memory card to verify the true holder of the memory card and gain access to the contents of the application file structure.

* * * * *

UNITED STATES PATENT AND TRADEMARK OFFICE
CERTIFICATE OF CORRECTION

PATENT NO.    : 6,011,858
DATED         : JANUARY 4, 2000
INVENTOR(S)   : STOCK ET AL.

It is certified that error appears in the above-identified patent and that said Letters Patent is hereby corrected as shown below:

```
Title page, under item [56],
  OTHER PUBLICATIONS
  insert
```

-- OROS Low Level Library Programmer's Guide RGCO5U10, version 1.0, November 1994, by GEMPLUS--.

Signed and Sealed this

Sixth Day of February, 2001

Attest:

Q. TODD DICKINSON

*Attesting Officer*      *Director of Patents and Trademarks*